(12) United States Patent
Nakatsugawa (10) Patent No.: US 6,408,011 B1
(45) Date of Patent: Jun. 18, 2002

(54) COMMUNICATION METHOD BETWEEN DEVICES HAVING DIFFERENT SAMPLING RATES AND COMMUNICATION SYSTEM EMPLOYING THE SAME

(75) Inventor: Yoshinori Nakatsugawa, Susono (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/174,456

(22) Filed: Oct. 19, 1998

(30) Foreign Application Priority Data

Oct. 20, 1997 (JP) .............................. 9-287142

(51) Int. Cl.[7] .................................. H04J 3/06
(52) U.S. Cl. ........................ 370/503; 375/356
(58) Field of Search .............................. 370/503, 516, 370/517, 274, 459, 460, 480; 375/225, 355, 362, 371, 356

(56) References Cited

U.S. PATENT DOCUMENTS

| | | | | |
|---|---|---|---|---|
| 4,680,779 A | * | 7/1987 | Wakerly | ..................... 375/107 |
| 5,245,667 A | * | 9/1993 | Lew | ............................. 381/94 |
| 5,487,092 A | * | 1/1996 | Finney et al. | ............... 375/354 |
| 6,167,061 A | * | 2/2000 | Nakatsugawa | .............. 370/480 |
| 6,266,383 B1 | * | 7/2001 | Kikuchi | ...................... 375/358 |

FOREIGN PATENT DOCUMENTS

| | | |
|---|---|---|
| JP | 62-86933 | 4/1987 |
| JP | 6-252906 | 9/1994 |
| JP | 7-161146 | 6/1995 |

* cited by examiner

Primary Examiner—Chau Nguyen
Assistant Examiner—Ron Abelson
(74) Attorney, Agent, or Firm—Oblon, Spivak, McClelland, Maier & Neustadt, P.C.

(57) ABSTRACT

When a route hub receives device data synchronized with a device reference clock set in a source device connected to the route hub from the source device, the route hub modulates the device data to communication data synchronized with a transmission reference clock; adds a phase information to be used to demodulate the modulated communication data into the device data, to an empty area which is equivalent to a difference between a number of bits of each unit block of the device data and a number of bits of each unit block of the communication data synchronized with the transmission reference clock, at the time of the modulation.

12 Claims, 8 Drawing Sheets

48KHz : H
44.1KHz : M
32KHz : L

MLR : LRCK OF 44.1KHz
MCK : BCK OF 44.1KHz
MDATA : DATA OF 44.1KHz

HLR : LRCK OF 44.1KHz
HCK : BCK OF 48KHz
HDATA : DATA OF 48KHz
HBLR : 1/5 FREQUENTLY DIVIDED WAVE OF LRCK OF 48KHz

FIG. 7

COMMUNICATION METHOD BETWEEN DEVICES HAVING DIFFERENT SAMPLING RATES AND COMMUNICATION SYSTEM EMPLOYING THE SAME

BACKGROUND OF THE INVENTION

1. Field of the Invention

The present invention relates to a communication system constructed by interconnecting a plurality of repeaters each having one or more devices connected thereto by a data transmission line and particularly to a communication method and a communication system capable of truly and precisely transmitting digital data from an input device to an output device having a different sampling rate from that of the input device.

2. Related Art

In recent years, digital audio equipment for recording and reproducing digitized characters, voice, image data or the like, such as CD (Compact Disk) drives, CD-ROM drives and DAT (Digital Audio Tape-recorder) units, have been rapidly widespread.

To record and reproduce original digital data (to be referred to as "original data" hereinafter) truly and precisely, a sampling rate is set in each of these digital audio equipment.

A sampling rate of 44.1 kHz is used for CD drives, 32, 44.1 or 48 kHz for DAT units, 32 kHz for RDS (Radio Data System) units which provide character information service and automatic broadcast reception service by FM multiplex broadcasting, 44.1 kHz for digital audio amplifiers incorporating a DSP (Digital Signal Processor), and 44.1 or 48 kHz for MD (Mini Disc) drives.

There may be a request for transferring digital data from an output unit having a relatively low sampling rate to an input unit having a relatively high sampling rate, for example, transferring original data from an RDS unit having a sampling rate of 32 kHz to a digital audio amplifier having a sampling rate of 48 kHz to output voice, or transferring original data from a CD drive having a sampling rate of 44.1 kHz to an MD drive having a sampling rate of 48 kHz to be recorded.

In this case, it is conceivable to interpose an interface between the input unit and the output unit to carry out the processing of matching the sampling rates of these units.

That is, as a first method, interpolation is carried out on the original data, thereby making it possible to exchange digital data between input and output units having different sampling rates. As a second method, original data from an output unit is stored in a transmission buffer using a FIFO (First-In First-Out) system, DMA (Direct Memory Access) system or the like, the stored digital data is transmitted at a predetermined bit rate higher than the sampling rate of an input unit, the digital data received at this predetermined bit rate is stored in a receiving buffer, and the stored digital data is transmitted to the input unit at a transmission bit rate synchronized with the sampling rate of the input unit, thereby making it possible to exchange digital data between input and output units having different sampling rates.

However, when the former method is employed, unnecessary data other than the original data is interpolated for the original data, thereby making it difficult to transmit the original data truly and precisely.

When the latter method is employed, an interface including a control unit for controlling the timing of reading or writing digital data from or to the transmitting buffer, receiving buffer or transmitting-receiving buffer is required, and thus this interface has complicated circuit configuration and is expensive.

SUMMARY OF THE INVENTION

In view of the above situation, it is an object of the present invention to provide a transmission method and a transmission system in which digital data can be transmitted truly and precisely from an input unit to an output unit having a different sampling rate from that of the input, by providing an interface having a simple and low cost circuit configuration between the input unit and the output unit.

To attain the above object, according to an aspect of the present invention, there is provided a transmission method, used in a transmission system constructed by interconnecting a plurality of repeaters, each having at least one device connected thereto, by a transmission line, for exchanging digital data between devices, between repeaters, or between a device and a repeater, the method comprising the steps of: setting a transmission reference clock which is the basis for an exchange of communication data between repeaters to an appropriate value in advance with reference to a plurality of device reference clocks set in at least one device; setting a number of bits of each unit block of communication data synchronized with the transmission reference clock and a number of bits of each unit block of plural device data synchronized with the plurality of device reference clocks respectively, to appropriate values in advance with reference to frequencies of the plurality of device reference clocks and a frequency of the transmission reference clock; modulating, by a repeater, device data to communication data synchronized with the transmission reference clock, when the device data synchronized with the device reference clock set in a source device connected to the repeater is output from the source device; adding a phase information to be used to demodulate the modulated communication data into device data, to an empty area which is equivalent to a difference between a number of bits of each unit block of the device data and a number of bits of each unit block of the communication data synchronized with the transmission reference clock, at the time of the modulation by the repeater; and transmitting the modulated communication data to a predetermined destination by the repeater.

According to the present invention, when a repeater receives the device data synchronized with the device reference clock set in a source device connected to the repeater from the source device, the repeater modulates the device data to communication data synchronized with the transmission reference clock; adds a phase information to be used to demodulate the modulated communication data into device data, to an empty area which is equivalent to a difference between a number of bits of each unit block of the device data and a number of bits of each unit block of the communication data synchronized with the transmission reference clock, at the time of the modulation; and transmits the modulated communication data to a predetermined destination by the repeater.

Therefore, by adding the phase information, the device data synchronized with the device reference clock set in the source device can be modulated to the communication data synchronized with the transmission reference clock without performing a processing of bit interpolation. As a result, digital data can be transmitted truly and precisely from an input unit to an output unit having a different sampling rate from that of the input unit.

In a preferred embodiment of the present invention, the phase information comprises a phase difference between a block synchronous signal of communication data synchronized with the transmission reference clock and a synchronous signal of a device reference clock set in the source device.

Further, to attain the above object, according to another aspect of the present invention, there is provided a transmission method, used in a transmission system constructed by interconnecting a plurality of repeaters, each having at least one device connected thereto, by a transmission line, for exchanging digital data between devices, between repeaters, or between a device and a repeater, the method comprising the steps of: setting a transmission reference clock which is the basis for an exchange of communication data between repeaters to an appropriate value in advance with reference to a plurality of device reference clocks set in at least one device; setting a number of bits of each unit block of communication data synchronized with the transmission reference clock and a number of bits of each unit block of plural device data synchronized with the plurality of device reference clocks respectively, to appropriate values in advance with reference to frequencies of the plurality of device reference clocks and a frequency of the transmission reference clock; demodulating, by a repeater, received communication data to device data synchronized with the device reference clock set in a destination device connected to the repeater, when the repeater receives communication data modulated to synchronize with the transmission reference clock and addressed to the destination device; extracting a phase information added at the time of modulation by using an empty area which is equivalent to a difference between a number of bits of each unit block of the device data and a number of bits of each unit block of the communication data synchronized with the transmission reference clock, at the time of demodulation by the repeater; and transmitting, by the repeater, the demodulated communication data to the destination device.

According to the present invention, when a repeater receives communication data modulated to synchronize with the transmission reference clock and addressed to a destination device connected to the repeater, the repeater demodulates the received communication data to device data synchronized with the device reference clock set in the destination device; extracts a phase information added at the time of modulation by using an empty area which is equivalent to a difference between a number of bits of each unit block of the device data and a number of bits of each unit block of the communication data synchronized with the transmission reference clock, at the time of demodulation; and transmits the demodulated communication data to the destination device.

Therefore, by extracting the phase information, the communication data modulated to synchronize with the transmission reference clock can be demodulated to the device data precisely synchronized with the device reference clock set in the source device without performing a processing of sinning bits. As a result, digital data can be transmitted truly and precisely from an input unit to an output unit having a different sampling rate from that of the input unit.

In a preferred embodiment of the present invention, the phase information comprises a phase difference between a block synchronous signal of communication data synchronized with the transmission reference clock and a synchronous signal of a device reference clock set in a source device.

Further, to attain the above object, according to still another aspect of the present invention, there is provided a transmission method, used in a transmission system constructed by interconnecting a plurality of repeaters, each having at least one device connected thereto, by a transmission line, for exchanging digital data between devices, between repeaters, or between a device and a repeater, the method comprising the steps of: setting a transmission reference clock which is the basis for an exchange of communication data between repeaters to an appropriate value in advance with reference to a plurality of device reference clocks set in at least one device; setting a number of bits of each unit block of communication data synchronized with the transmission reference clock and a number of bits of each unit block of plural device data synchronized with the plurality of device reference clocks respectively, to appropriate values in advance with reference to frequencies of the plurality of device reference clocks and a frequency of the transmission reference clock; modulating, by a repeater, device data to communication data synchronized with the transmission reference clock, when the device data synchronized with the device reference clock set in a source device connected to the repeater is output from the source device; adding a phase information to be used to demodulate the modulated communication data into device data, to an empty area which is equivalent to a difference between a number of bits of each unit block of the device data and a number of bits of each unit block of the communication data synchronized with the transmission reference clock, at the time of the modulation by the repeater; transmitting the modulated communication data to a predetermined destination by the repeater; demodulating, by the repeater, received communication data to device data synchronized with the device reference clock set in a destination device connected to the repeater, when the repeater receives communication data modulated to synchronize with the transmission reference clock and addressed to the destination device; extracting the phase information added at the time of modulation by using the empty area which is equivalent to the difference between the number of bits of each unit block of the device data and the number of bits of each unit block of the communication data synchronized with the transmission reference clock, at the time of demodulation by the repeater; and transmitting, by the repeater, the demodulated communication data to the destination device.

According to the present invention, when a repeater receives the device data synchronized with the device reference clock set in a source device connected to the repeater from the source device, the repeater modulates the device data to communication data synchronized with the transmission reference clock; adds a phase information to be used to demodulate the modulated communication data into device data, to an empty area which is equivalent to a difference between a number of bits of each unit block of the device data and a number of bits of each unit block of the communication data synchronized with the transmission reference clock, at the time of the modulation; and transmits the modulated communication data to a predetermined destination by the repeater. Conversely, when a repeater receives communication data modulated to synchronize with the transmission reference clock and addressed to a destination device connected to the repeater, the repeater demodulates the received communication data to device data synchronized with the device reference clock set in the destination device;

extracts the phase information added at the time of modulation by using the empty area which is equivalent to the difference between the number of bits of each unit block of the device data and the number of bits of each unit block of the communication data synchronized with the transmission reference clock, at the time of demodulation; and transmits the demodulated communication data to the destination device.

Therefore, by adding the phase information, the device data synchronized with the device reference clock set in the source device can be modulated to the communication data synchronized with the transmission reference clock without performing a processing of bit interpolation. Further, by extracting the phase information, the communication data modulated to synchronize with the transmission reference clock can be demodulated to the device data precisely synchronized with the device reference clock set in the source device without performing a processing of singing bits. As a result, digital data can be transmitted truly and precisely from an input unit to an output unit having a different sampling rate from that of the input unit.

In a preferred embodiment of the present invention, the phase information comprises a phase difference between a block synchronous signal of communication data synchronized with the transmission reference clock and a synchronous signal of a device reference clock set in the source device.

Further, to attain the above object, according to yet another aspect of the present invention, there is provided a transmission system constructed by interconnecting a plurality of repeaters, each having at least one device connected thereto, by a transmission line, for exchanging digital data between devices, between repeaters, or between a device and a repeater, each of the plurality of repeaters comprising: modulating means for modulating device data to communication data synchronized with the transmission reference clock, when the device data synchronized with the device reference clock set in a source device connected to the repeater is output from the source device, the transmission reference clock being the basis for an exchange of communication data between repeaters and being set to an appropriate value in advance with reference to a plurality of device reference clocks set in at least one device; phase information adding means for adding a phase information to be used to demodulate the modulated communication data into device data, to an empty area which is equivalent to a difference between a number of bits of each unit block of the device data and a number of bits of each unit block of the communication data synchronized with the transmission reference clock, at the time of the modulation by the modulating means, a number of bits of each unit block of the communication data synchronized with the transmission reference clock and a number of bits of each unit block of plural device data synchronized with the plurality of device reference clocks respectively being set to appropriate values in advance with reference to frequencies of the plurality of device reference clocks and a frequency of the transmission reference clock; and transmitting means for transmitting the communication data modulated by the modulating means to a predetermined destination.

According to the present invention, when a repeater receives the device data synchronized with the device reference clock set in a source device connected to the repeater from the source device, modulating means in the repeater modulates the device data to communication data synchronized with the transmission reference clock, and then phase information adding means adds a phase information to be used to demodulate the modulated communication data into device data, to an empty area which is equivalent to a difference between a number of bits of each unit block of the device data and a number of bits of each unit block of the communication data synchronized with the transmission reference clock, at the time of the modulation, and then transmitting means transmits the modulated communication data to a predetermined destination by the repeater.

Therefore, by adding the phase information, the device data synchronized with the device reference clock set in the source device can be modulated to the communication data synchronized with the transmission reference clock without performing a processing of bit interpolation. As a result, digital data can be transmitted truly and precisely from an input unit to an output unit having a different sampling rate from that of the input unit.

In a preferred embodiment of the present invention, the phase information comprises a phase difference between a block synchronous signal of communication data synchronized with the transmission reference clock and a synchronous signal of a device reference clock set in the source device.

Further, to attain the above object, according to further aspect of the present invention, there is provided a transmission system constructed by interconnecting a plurality of repeaters, each having at least one device connected thereto, by a transmission line, for exchanging digital data between devices, between repeaters, or between a device and a repeater, each of the plurality of repeaters comprising: demodulating means for demodulating received communication data to device data synchronized with the device reference clock set in a destination device connected to the repeater, when the repeater receives communication data modulated to synchronize with the transmission reference clock and addressed to the destination device, the transmission reference clock being the basis for an exchange of communication data between repeaters and being set to an appropriate value in advance with reference to a plurality of device reference clocks set in at least one device; phase information extracting means for extracting a phase information added at the time of modulation by using an empty area which is equivalent to a difference between a number of bits of each unit block of the device data and a number of bits of each unit block of the communication data synchronized with the transmission reference clock, at the time of demodulation by the demodulating means, a number of bits of each unit block of the communication data synchronized with the transmission reference clock and a number of bits of each unit block of plural device data synchronized with the plurality of device reference clocks respectively being set to appropriate values in advance with reference to frequencies of the plurality of device reference clocks and a frequency of the transmission reference clock; and transmitting means for transmitting the communication data demodulated by demodulating means to the destination device.

According to the present invention,.when a repeater receives communication data modulated to synchronize with the transmission reference clock and addressed to a destination device connected to the repeater, demodulating means in the repeater demodulates the received communication data to device data synchronized with the device reference clock set in the destination device, and then phase information extracting means extracts a phase information added at the time of modulation by using an empty area which is equivalent to a difference between a number of bits of each unit block of the device data and a number of bits of each unit block of the communication data synchronized with the transmission reference clock, at the time of demodulation, and then transmitting means transmits the demodulated communication data to the destination device.

Therefore, by extracting the phase information, the communication data modulated to synchronize with the transmission reference clock can be demodulated to the device data precisely synchronized with the device reference clock set in the source device without performing a processing of sinning bits. As a result, digital data can be transmitted truly and precisely from an input unit to an output unit having a different sampling rate from that of the input unit.

In a preferred embodiment of the present invention, the phase information comprises a phase difference between a block synchronous signal of communication data synchronized with the transmission reference clock and a synchronous signal of a device reference clock set in a source device.

Further, to attain the above object, according to still further aspect of the present invention, there is provided a transmission system constructed by interconnecting a plurality of repeaters, each having at least one device connected thereto, by a transmission line, for exchanging digital data between devices, between repeaters, or between a device and a repeater, each of the plurality of repeaters comprising: modulating means for modulating device data to communication data synchronized with the transmission reference clock, when the device data synchronized with the device reference clock set in a source device connected to the repeater is output from the source device, the transmission reference clock being the basis for an exchange of communication data between repeaters and being set to an appropriate value in advance with reference to a plurality of device reference clocks set in at least one device; phase information adding means for adding a phase information to be used to demodulate the modulated communication data into device data, to an empty area which is equivalent to a difference between a number of bits of each unit block of the device data and a number of bits of each unit block of the communication data synchronized with the transmission reference clock, at the time of the modulation by the modulating means, a number of bits of each unit block of the communication data synchronized with the transmission reference clock and a number of bits of each unit block of plural device data synchronized with the plurality of device reference clocks respectively being set to appropriate values in advance with reference to frequencies of the plurality of device reference clocks and a frequency of the transmission reference clock; first transmitting means for transmitting the communication data modulated by the modulating means to a predetermined destination; demodulating means for demodulating received communication data to device data synchronized with the device reference clock set in a destination device connected to the repeater, when the repeater receives communication data modulated to synchronize with the transmission reference clock and addressed to the destination device; phase information extracting means for extracting the phase information added at the time of modulation by using the empty area which is equivalent to the difference between the number of bits of each unit block of the device data and the number of bits of each unit block of the communication data synchronized with the transmission reference clock, at the time of demodulation by the demodulating means; and second transmitting means for transmitting the communication data demodulated by demodulating means to the destination device.

According to the present invention, when a repeater receives the device data synchronized with the device reference clock set in a source device connected to the repeater from the source device, modulating means in the repeater modulates the device data to communication data synchronized with the transmission reference clock, and then phase information adding means adds a phase information to be used to demodulate the modulated communication data into device data, to an empty area which is equivalent to a difference between a number of bits of each unit block of the device data and a number of bits of each unit block of the communication data synchronized with the transmission reference clock, at the time of the modulation, and then first transmitting means transmits the modulated communication data to a predetermined destination by the repeater. Conversely, when a repeater receives communication data modulated to synchronize with the transmission reference clock and addressed to a destination device connected to the repeater, demodulating means in the repeater demodulates the received communication data to device data synchronized with the device reference clock set in the destination device, and then phase information extracting means extracts the phase information added at the time of modulation by using the empty area which is equivalent to the difference between the number of bits of each unit block of the device data and the number of bits of each unit block of the communication data synchronized with the transmission reference clock, at the time of demodulation, and then second transmitting means transmits the demodulated communication data to the destination device.

Therefore, by adding the phase information, the device data synchronized with the device reference clock set in the source device can be modulated to the communication data synchronized with the transmission reference clock without performing a processing of bit interpolation. Further, by extracting the phase information, the communication data modulated to synchronize with the transmission reference clock can be demodulated to the device data precisely synchronized with the device reference clock set in the source device without performing a processing of sinning bits. As a result, digital data can be transmitted truly and precisely from an input unit to an output unit having a different sampling rate from that of the input unit.

In a preferred embodiment of the present invention, the phase information comprises a phase difference between a block synchronous signal of communication data synchronized with the transmission reference clock and a synchronous signal of a device reference clock set in the source device.

The nature, principle and utility of the invention will become more apparent from the following detailed description when read in conjunction with the accompanying drawings.

DESCRIPTION OF THE PREFERRED EMBODIMENTS

The communication method and the communication system according to preferred embodiments of the present invention will be described in detail with reference to the accompanying drawings.

Figure 1:
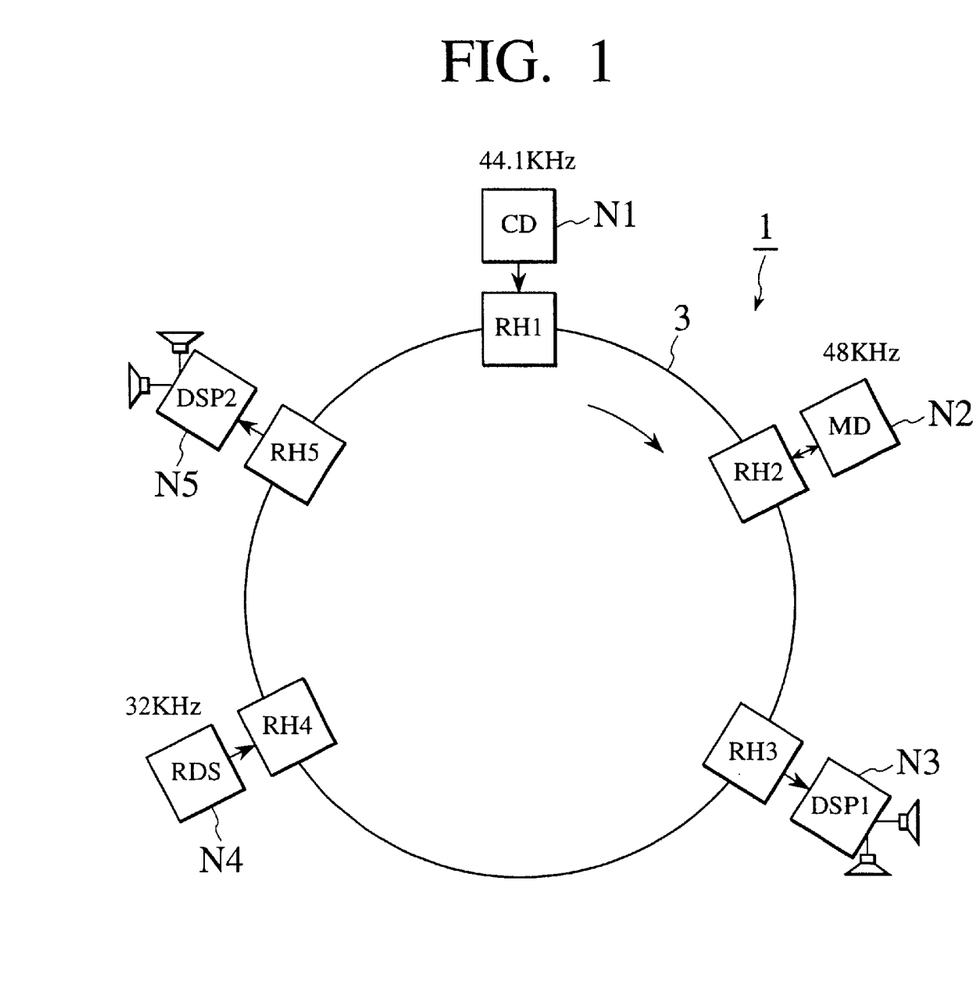
FIG. 1 is a schematic block diagram of a whole transmission system based on the present invention.

As shown in FIG. 1, the communication system 1 according to the present invention is constructed by interconnecting a plurality of route hubs RH1, RH2, RH3, RH4, RH5 which serve as repeaters by a loop-configuration data transmission line 3 so that data can be exchanged therebetween. The topology of the network of the communication system 1 may be bus, star or other suitable configuration other than the above loop.

Each of the plurality of route hub RH is connected to one or more functional devices N so that data can be exchanged between route hubs RH, functional devices N, or a functional device N and a route hub RH by the data transmission line 3 which permits the transmission of communication data in a direction shown by an arrow in FIG. 1. In FIG. 1, functional devices N1 to N5 are connected to the plurality of route hubs RH1, RH2, RH3, RH4, RH4, RH5, respectively.

The functional device N may be a CD drive having a sampling rate of 44.1 kHz, MD drive having a sampling rate of 48 kHz, digital audio amplifier incorporating a DSP having a sampling rate of 44.1 kHz, RDS unit, CD-ROM drive, DAT unit, portable telephone, facsimile, digital TV, navigation unit, car receiver for receiving traffic information from VICS (Vehicle Information and Communication System), car communication unit for communicating charge information with ETC (Electrical Toll Collection system), DVD (Digital Video Disc)-ROM drive, CAN (Controller Area Network) interface, sensor such as a bearing sensor or car speed sensor, monitor or car personal computer having a sampling rate of 32 kHz, or the like.

A specific address is assigned to each of the plurality of route hubs RH and each of the functional units N so that each can be identified. When data is to be exchanged between route hubs RH, functional devices N, or a functional device N and a route hub RH over the data transmission line 3, these addresses are used to specify the destination or source. In FIG. 1, specific addresses such as RH1, RH2, RH3, RH4, RH5 are assigned to the plurality of route hubs RH, and N1, N2, N3 ... are assigned to the plurality of functional devices N, respectively.

Figure 2:
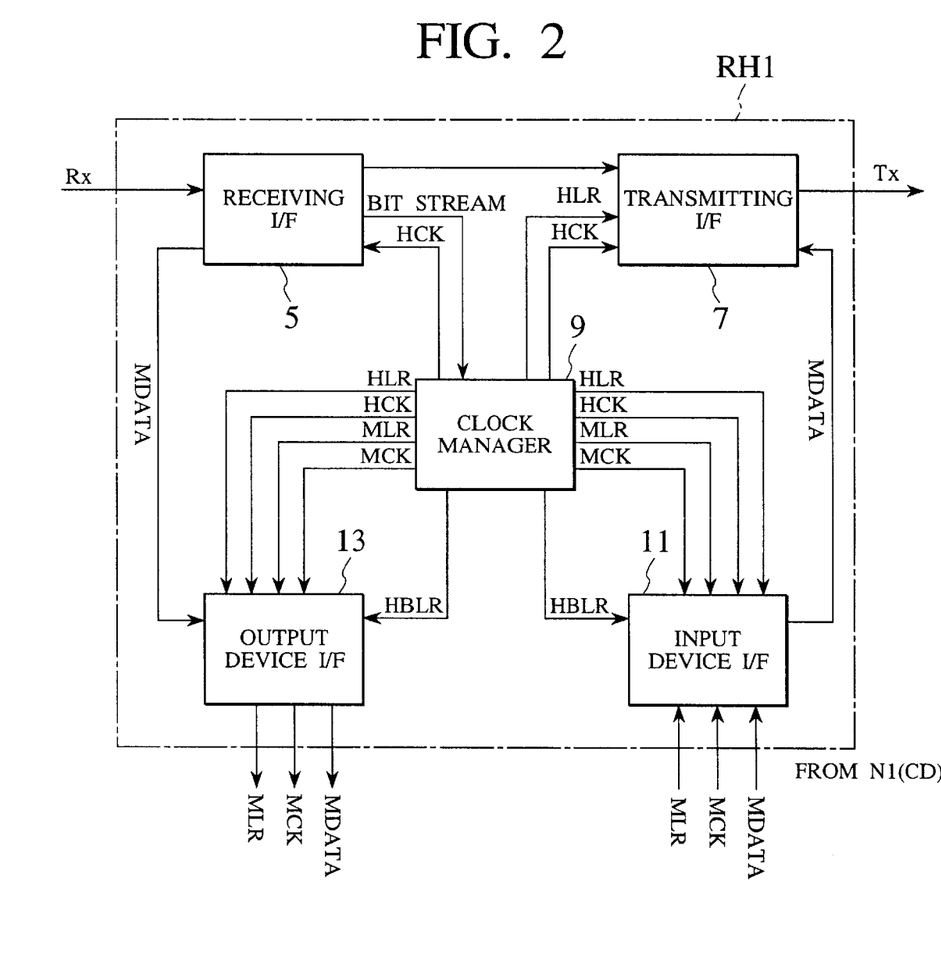
FIG. 2 is a block diagram of internal configuration of a repeater which is a key part of the transmission system.

The internal configuration of the route hub RH which serves as a repeater will be described hereinunder with reference to the block diagram of FIG. 2, taking route hub RH1 as a typical example.

Figure 5:
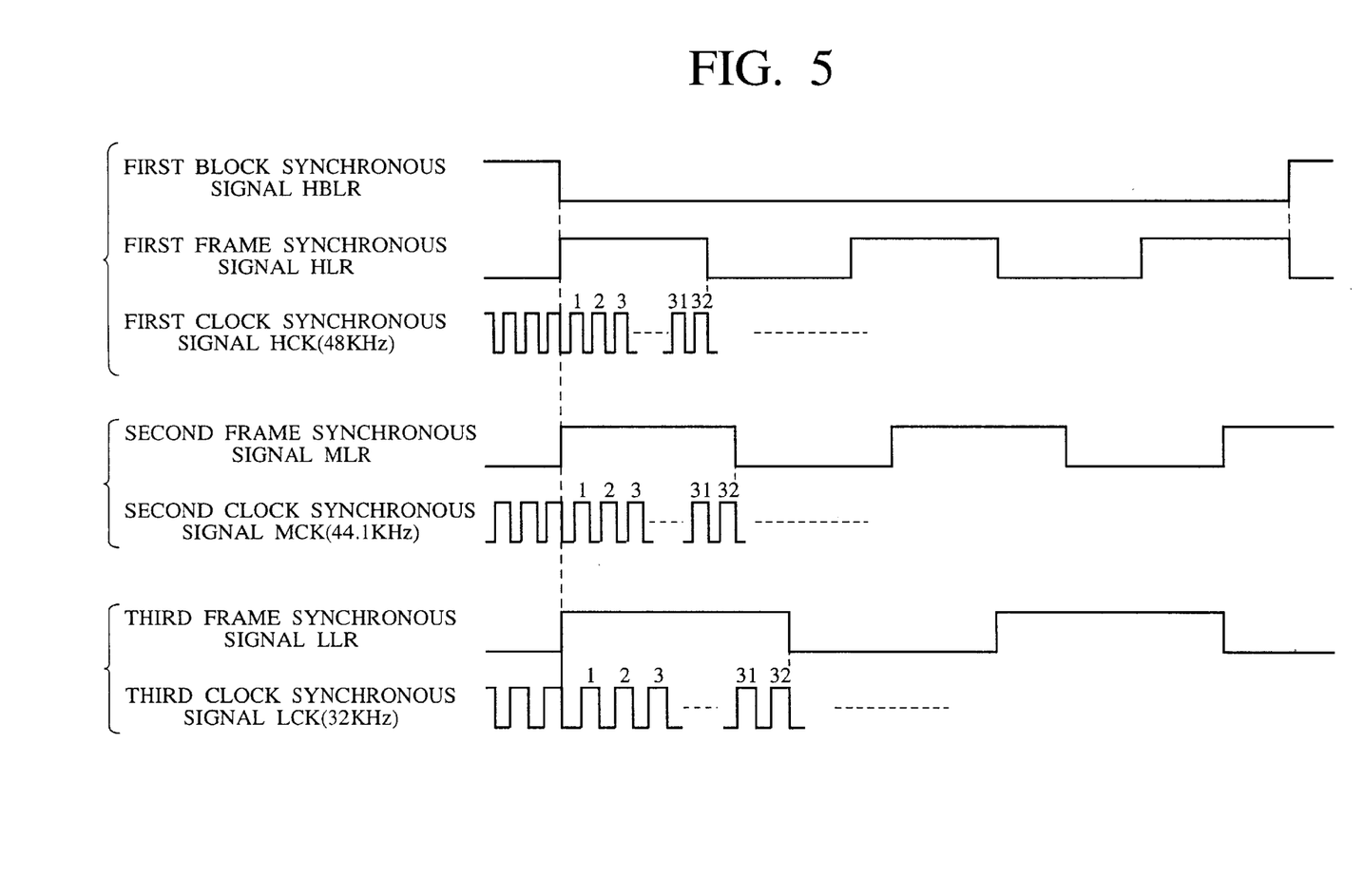
FIG. 5 is a diagram for explaining synchronous signal employed in the transmission system on the present invention.
Figure 6:
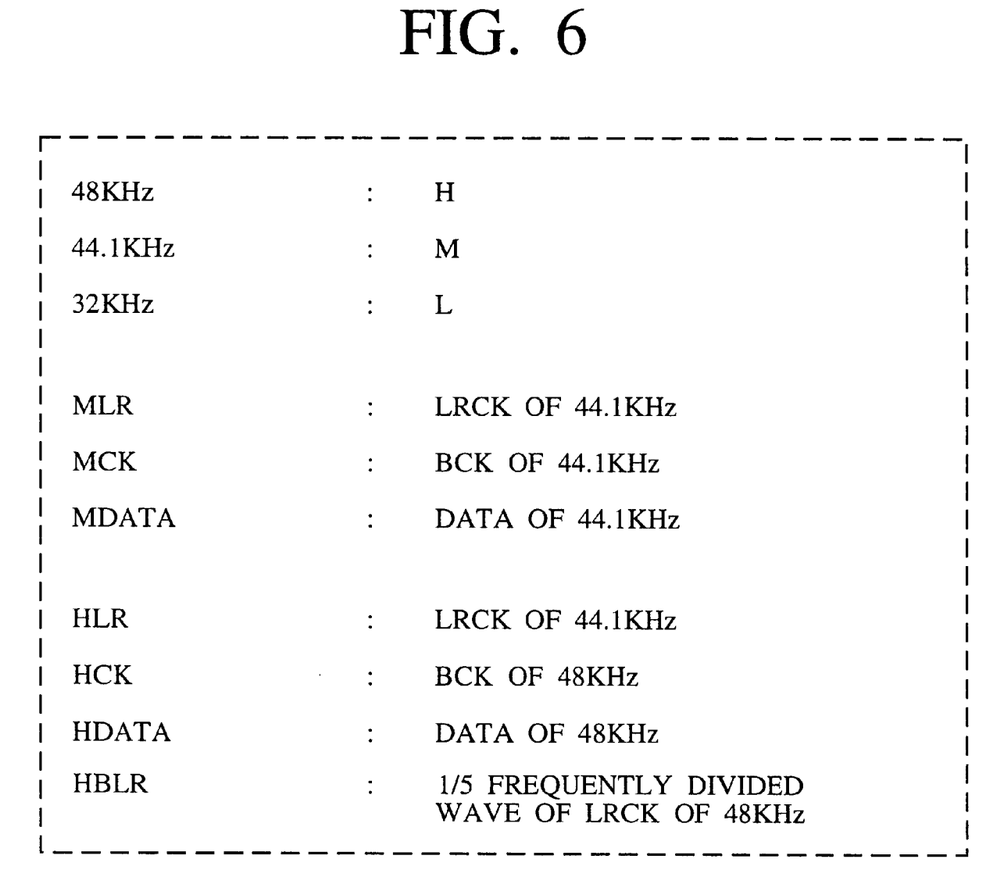
FIG. 6 is a list of abbreviations showing the signals used in the transmission system on the present invention.

For the convenience of explanation, as shown in FIGS. 5 and 6, the clock synchronous signal (48 kHz) of device data output from a functional device N such as an MD drive having a sampling rate of 48 kHz is called "first clock synchronous signal HCK", the clock synchronous signal (44.1 kHz) of device data output from a functional device N such as a CD drive having a sampling rate of 44.1 kHz is called "second clock synchronous signal MCK", and the clock synchronous signal (32 KHz) of device data output from a functional device N such as an RDS unit having a sampling rate of 32 kHz is called "third clock synchronous signal LCK". The clock synchronous signals of device data output from the above functional devices N are generally called "device reference clock". Each of the functional devices N outputs device data in synchronism with each bit of the device reference clock set in each of them. Device data output from each of the functional devices N is composed of unit blocks, each consisting of a predetermined number of frames, each frame having a predetermined number of bits. In this embodiment, as shown in FIG. 5, each frame consists of 32 bits which are contained in one subchannel.

The route hub RH1 comprises a receiving interface (to be referred to as "I/F" hereinafter) 5, transmitting I/F 7, clock manager 9, an input unit I/F 11 connected to the functional device N1 (CD) and output unit I/F 13.

The receiving I/F 5 has functions to receive digital communication data including instructions and source data transmitted from the route hub RH5 on an upstream side thereof over the data transmission line 3 in synchronism with each bit of a predetermined transmission reference clock which will be described hereinafter and to deliver the received communication data to an appropriate destination. The above predetermined transmission reference clock is a clock which is the basis for the exchange of communication data between route hubs RH and is set to an appropriate value with reference to clock synchronous signals for sampling rates set in the functional devices N connected to the route hubs RH constituting the communication system. In this embodiment, the first clock synchronous signal (48 kHz) HCK which is the largest out of the clock synchronous signals for the plurality of sampling rates of the functional devices N is used as the predetermined transmission reference clock.

The transmitting I/F 7 has a function to transmit communication data from the receiving I/F 5 or the input unit I/F 11 to the route hub RH2 on a downstream side thereof over the data transmission line 3 in synchronism with each bit of the predetermined transmission reference clock.

The clock manager 9 has a function to deliver synchronous signals to the receiving I/F 5, transmitting I/F 7, input unit I/F 11 and output unit I/F 13.

Figure 3:
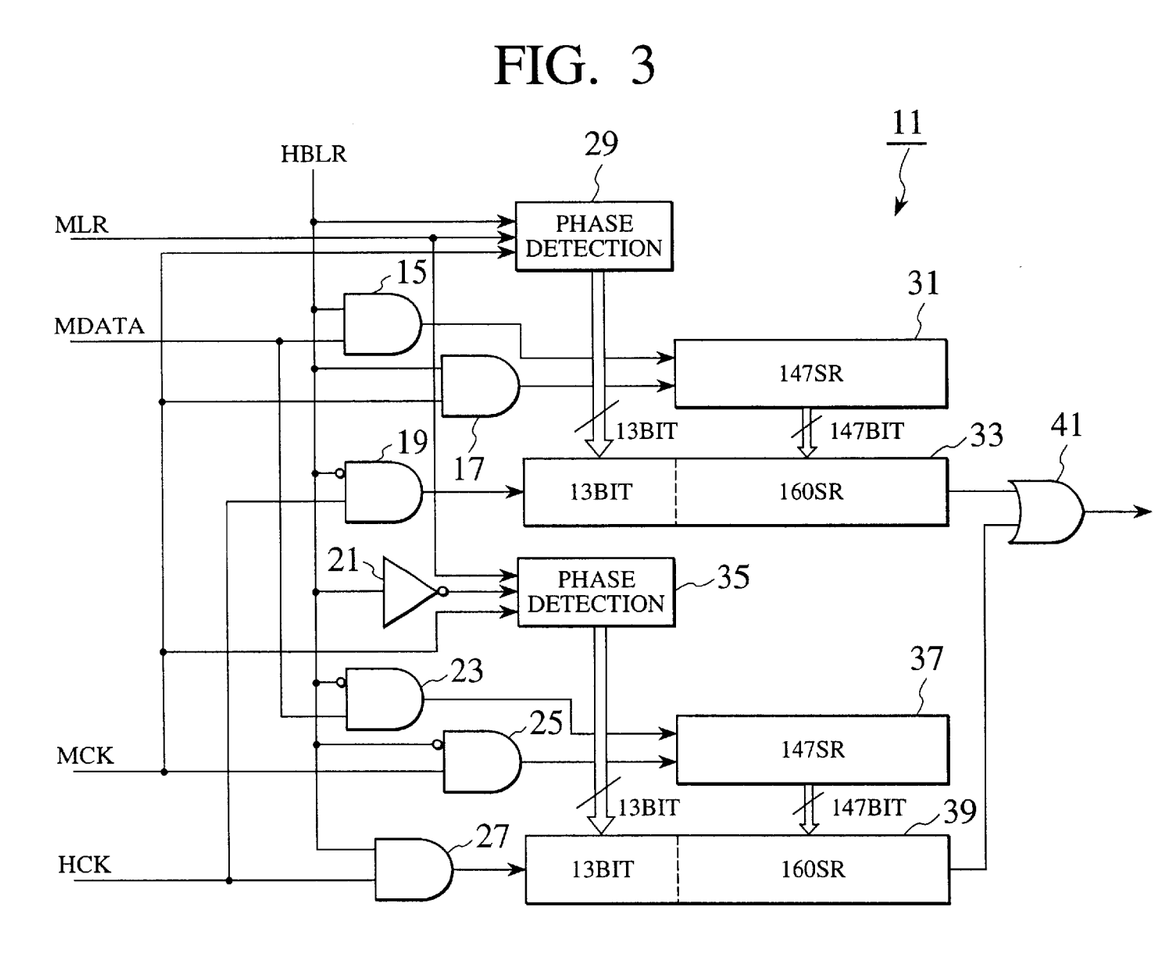
FIG. 3 is a block diagram of a circuit for modulating digital data in a repeater which is a key part of the transmission system.

As shown in FIG. 3, the input unit I/F 11 comprises first to sixth AND circuits 15, 17, 19, 23, 25, 27, one NOT circuit 21, two phase detection means 29, 35, first and second 147-bit 147 shift registers (147SRs) 31, 37, first and second 160-bit 160 shift registers (160SRs) 33, 39 and a first OR circuit 41, and has functions to provide 13-bit phase information to device data which is transmitted from the functional device N1 (CD) and is bit-synchronized with the second clock synchronous signal MCK and frame-synchronized with the second frame synchronous signal MLR which is the frame synchronous signal of the second clock synchronous signal MCK every 147 bits and to output the 160-bit unit device data provided with the phase information in bit-synchronism with the predetermined transmission reference clock HCK.

The principle of modulating, for example, device data bit-synchronized with the second clock synchronous signal (44.1 kHz) into communication data bit-synchronized with the predetermined transmission reference clock (48 kHz) will be described hereinunder.

The greatest common divisor between the frequency of the second clock synchronous signal (44.1 kHz) MCK and the predetermined transmission reference clock (48 kHz) HCK is first obtained and both of the clock frequencies are divided by the obtained value (300) to obtain 44.1 K:48

K=147:160. Then, the number of bits of each unit block of the device data bit-synchronized with the second clock synchronous signal (44.1 kHz) MCK is set to 147 bits and the number of bits of each unit block of device data bit-synchronized with the predetermined transmission reference clock (48 kHz) HCK is set to 160 bits.

Since 160 bits/32 bits is 5, the number of frames of each unit block of the device data bit-synchronized with the predetermined transmission reference clock (48 kHz) HCK, that is, the number of sub-channels, is set to 5.

Figure 7:
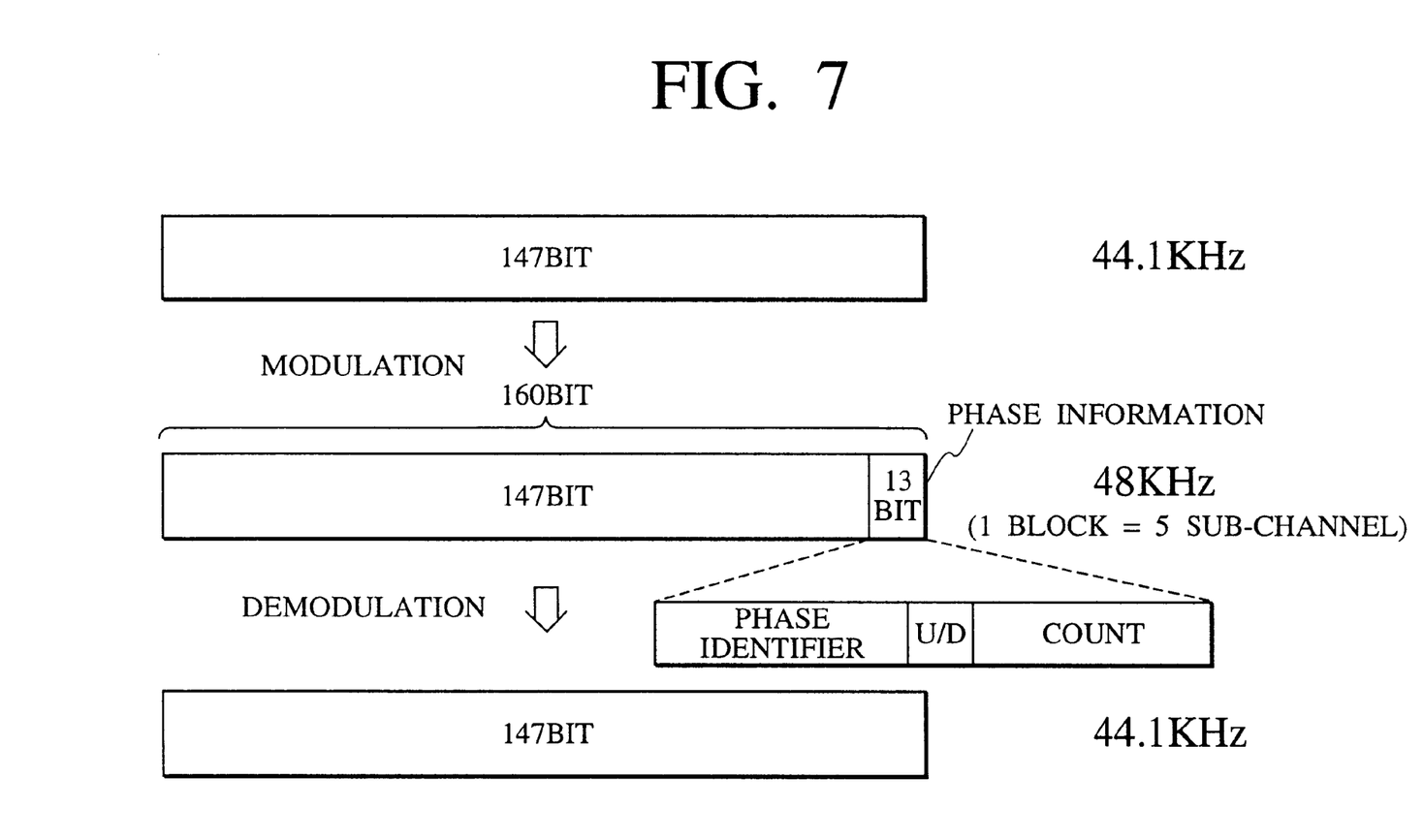
FIG. 7 is a diagram for explaining an operation of modulation/demodulation in the transmission system on the present invention.

To modulate the device data bit-synchronized with the second clock synchronous signal (44.1 kHz) MCK into communication data bit-synchronized with the predetermined transmission reference clock (48 kHz) HCK, the device data having 147-bit data per block should be modulated into communication data having 160-bit data per block, as shown in FIG. 7. Since a 13-bit empty area which is equivalent to the difference between 160 bits and 147 bits is formed for each block at the time of modulation, phase information to be used to demodulate the modulated communication data into the device data is added by using this 13-bit empty area.

Device data input into the input unit I/F 11 from the functional device N1 (CD) at the timing of the first block synchronous signal HBLR=H which is the block synchronous signal of the first frame synchronous signal HLR is output at the timing of HBLR=L. The input unit I/F 11 also receives device data at the timing of HBLR=L, and the device data input at that timing is output at the timing of HBLR=H.

Figure 4:
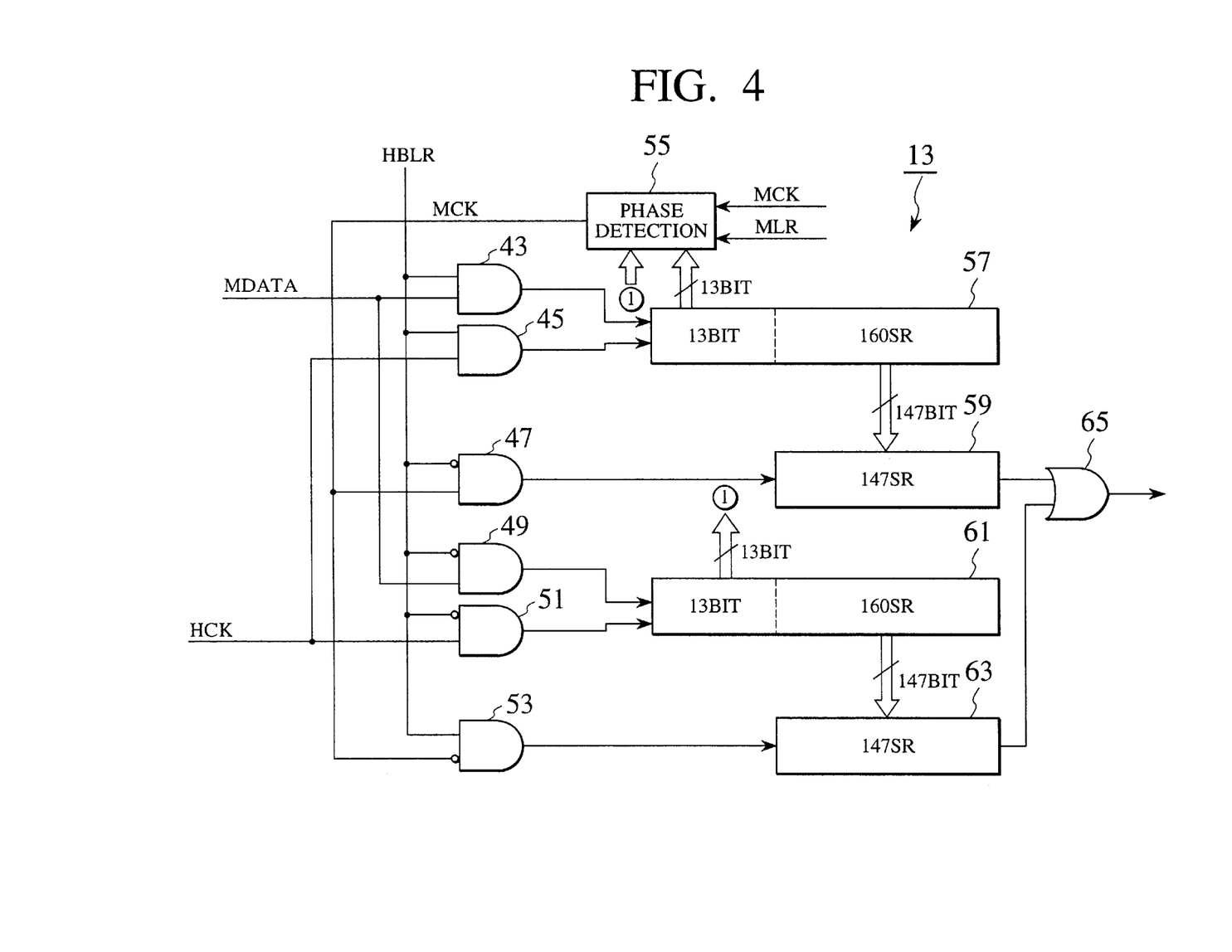
FIG. 4 is a block diagram of a circuit for demodulating digital data in a repeater which is a key part of the transmission system.

As shown in FIG. 4, the output unit I/F 13 comprises seventh to twelfth AND circuits 43, 45, 47, 49, 51, 53, a phase correction means 55, third and fourth 160-bit shift registers (160SR) 57, 61, third and fourth 147-bit 147 shift registers (147SR) 59, 63 and a second OR circuit 65. The output unit I/F 13 has functions to extract 13-bit phase information from each 160-bit unit data of communication data frame-synchronized with the second frame synchronous signal MLR transmitted from the receiving I/F 5 and to output each 147-bit unit data of communication data from which the phase information has been extracted to the functional device N as device data in bit-synchronism with the second clock synchronous signal MCK. Phase correction is carried out on the second frame synchronous signal MLR with reference to the extracted phase information.

To demodulate, for example, the communication data which has been modulated to be bit-synchronized with the predetermined transmission reference clock (48 kHz) HCK into device data bit-synchronized with the second clock synchronous signal (44.1 kHz) MCK, the communication data having 160-bit data per block should be demodulated into communication data having 147-bit data per block, as shown in FIG. 7. The phase information which has been provided at the time of modulation using the 13-bit empty area which is equivalent to the difference between 147 and 160 bits is extracted at the time of demodulation.

Communication data input into the output unit I/F 13 from the receiving I/F 5 at the timing of the first block synchronous signal HBLR H is output at the timing of HBLR =L. The output unit I/F 13 also receives communication data at the timing of HBLR=L, and the communication data input at that timing is output at the timing of HBLR=H.

Describing the 13-bit phase information which is provided to device data having 147-bit data per block, the phase information includes the phase difference between the synchronous signal of each functional device N and the first block synchronous signal HBLR, state information on the synchronous signal of each functional device N and the like. In concrete terms, the phase information according to this embodiment consists of a 7-bit phase identifier area for storing a phase identifier, a 1-bit up/down identification information description area for storing identification information (U/D) on whether the first frame synchronous signal HLR rises or falls right after the change point of the first block synch signal HBLR, and a 5-bit phase difference information description area for storing the amount of delay of the clock synchronous signal of a specific functional device N with respect to the first block synchronous signal HBLR.

A description is subsequently given of the internal configurations of the functional device N3 (DSP 1) and the functional device N5 (DSP 2) with reference to the block diagram of FIG. 8.

Figure 8:
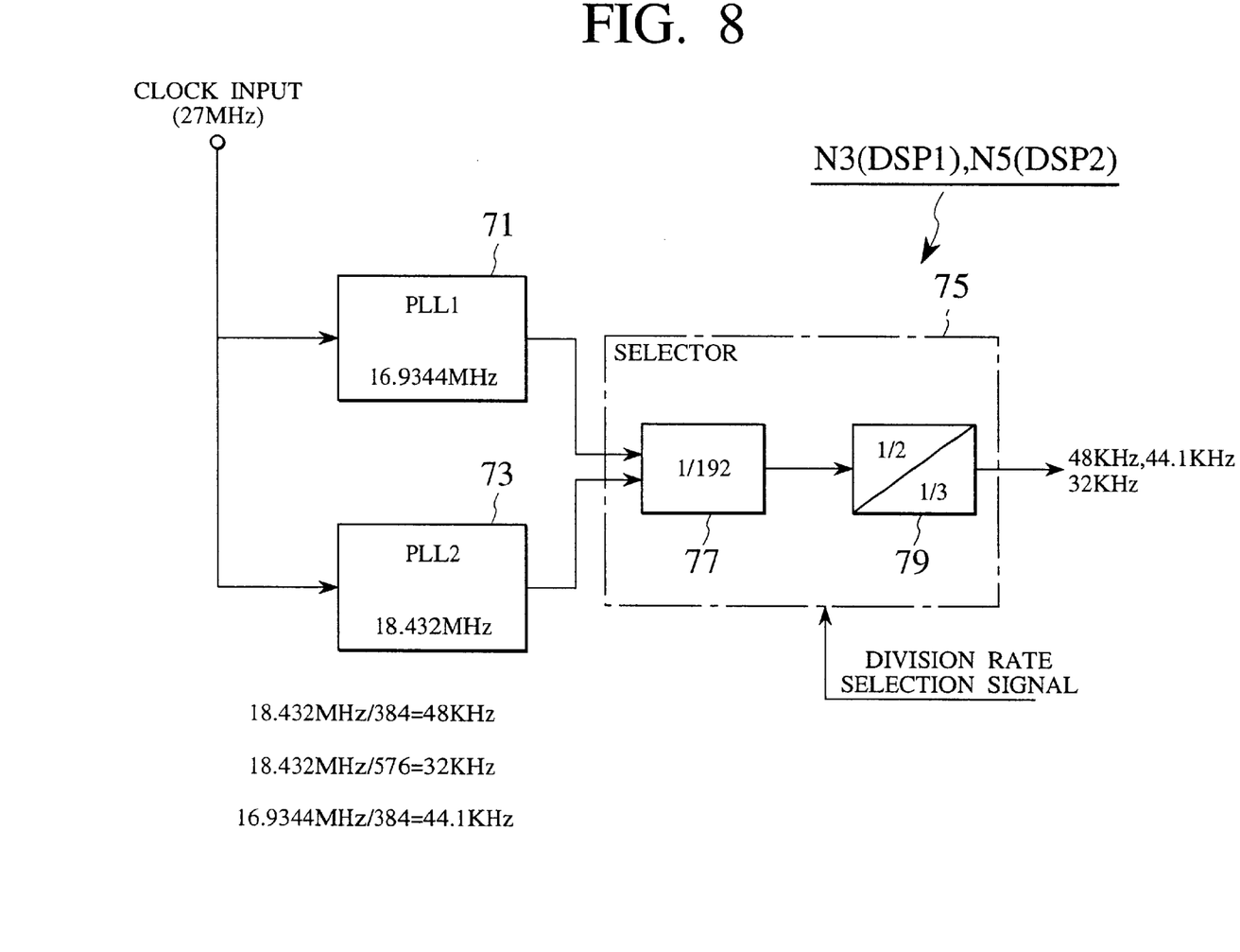
FIG. 8 is a schematic block diagram of a circuit provided in the functional device.

As shown in FIG. 8, each of the functional devices N3 (DSP 1) and N5 (DSP 2) comprises a first phase locked loop (PLL1) 71 for inputting a 27 MHz clock and outputting a 16.9344 MHz clock, a second phase locked loop (PLL2) 73 for inputting a 27 MHz clock and outputting a 18.432 MHz clock and a division rate selector 75. The division rate selector 75 comprises a first frequently dividing circuit 77 for frequently dividing an input clock by 192 and outputting the divided clock and a second frequently dividing circuit 79 for frequently dividing the input clock by 2 or 3 according to a division rate selection signal and outputting the divided clock. Accordingly, in the functional device N3 (DSP1) and functional device N5 (DSP2), either one of the output clocks of the first phase locked loop (PLL1) 71 and the second phase locked loop (PLL2) 73 is suitably selected and either one of division rates, 1/2 and 1/3, is selected to selectively output one clock synchronous signal from 48 kHz, 44.1 kHz and 32 kHz clock synchronous signals.

A description is subsequently given of the operation of each route hub RH with reference to FIGS. 2, 3, 4 and 7, taking the route hub RH1 as a typical example and paying attention to modulation and demodulation at the input unit I/1 11 and the output unit I/F 13, respectively.

First, the modulation of the input unit I/F 11 is described hereinunder. The device data MDATA output from the functional device N in bit-synchronism with the second clock synchronous signal MCK as well as in frame-synchronism with the second frame synchronous signal MLR is applied in series to the first 147 shift register (147SR) 31 in bit-synchronism with the second clock synchronous signal MCK at the timing of the first block synchronous signal HBLR=H through the first AND circuit 15. The 147-bit unit communication data stored in the first 147 shift register (147SR) 31 is applied in parallel to the first 160 shift register (160SR) 33, while 13-bit phase information detected by phase detection means 29 is applied in parallel to the first 160 shift register (160SR) 33. The 160-bit unit communication data stored in the first 160 shift register (160SR) 33 is output in series to the first OR circuit 41 from the first 160 shift register (160SR) 33 in bit-synchronism with the first clock synchronous signal HCK at the timing of the first block synchronous signal HBLR=L.

The device data MDATA output from the functional device N in bit-synchronism with the second clock synchronous signal MCK as well as in frame-synchronism with the second frame synchronous signal MLR is applied in series to the second 147 shift register (147SR) 37 in bit-synchronism with the second clock synchronous signal MCK at the timing of the first block synchronous signal HBLR=L through the fourth AND circuit 23. The 147-bit unit communication data stored in the second 147 shift register (147SR) 37 is applied in parallel to the second 160 shift register (160SR) 39, while 13-bit phase information detected by the phase detection means 35 is applied in parallel to the second 160 shift register (160SR) 39. The 160-bit unit communication data stored in the second 160 shift register (160SR) 39 is output in series to the first OR circuit 41 from the second 160 shift register (160SR) 39 in bit-synchronism with the first clock synchronous signal HCK at the timing of the first block synchronous signal HBLR=H.

The first OR circuit 41 carries out the OR operation of the 160-bit unit communication data applied in series from the first 160 shift register (160SR) 33 and the 160-bit unit communication data applied in series from the second 160 shift register (160SR) 39 and outputs the result of the OR operation of both communication data as communication data.

The communication data output from the first OR circuit 41 is obtained by modulating the device data bit-synchronized with the second clock synchronous signal (44.1 kHz) MCK so that it is bit-synchronized with the predetermined transmission reference clock (48 kHz) HCK. This modulated communication data is transmitted from the transmitting I/F 7 of the route hub RH1 to a predetermined destination.

According to the communication method and the communication system of the present invention, to modulate, for example, device data bit-synchronized with the second clock synchronous signal (44.1 kHz) MCK into communication data bit-synchronized with the predetermined transmission reference clock (48 kHz) HCK for transmission, the device data having 147-bit data per block is modulated into communication data having 160-bit data per block and phase information which is used to demodulate the modulated communication data into the device data is provided using a 13-bit empty area which is equivalent to the difference between 147 bits and 160 bits at the time of modulation, as shown in FIG. 7, thereby making unnecessary the processing of bit interpolation and making it possible to modulate the device data bit-synchronized with the second clock synchronous signal (44.1 kHz) MCK into communication data bit-synchronized with the predetermined transmission reference clock (48 kHz) HCK for transmission. As a result, digital data can be transmitted truly and precisely from an input unit to an output unit having a different sampling rate from that of the input unit.

A description is subsequently given of the processing of demodulation at the output unit I/F 13. For example, the 160-bit unit communication data MDATA transmitted from the receiving I/F 5 in frame-synchronism with the second frame synchronous signal MLR is applied in series to the third 160 shift register (169SR) 57 in bit-synchronism with the first clock synchronous signal HCK at the timing of the first block synchronous signal HBLR=H through the seventh AND circuit 43. The 13-bit phase information is extracted in parallel from the 160-bit unit communication data stored in the third 160 shift register (160SR) 57 by the phase correction means 55. The 147-bit unit device data from which the phase information has been extracted is applied in parallel to the third 147 shift register (147SR) 59. Then the 147-bit unit device data stored in the third 147 shift register (147SR) 59 is output in series from the third 147 shift register (147SR) 59 to the second OR circuit 65 in bit-synchronism with the second clock synchronous signal MCK at the timing of the first block synchronous signal HBLR=L.

The 160-bit unit communication data MDATA transmitted from the receiving I/F 5 in frame-synchronism with the second frame synchronous signal MLR is applied in series to the fourth 160 shift register (160SR) 61 in bit-synchronism with the first clock synchronous signal HCK at the timing of the first block synchronous signal HBLR=L through the tenth AND circuit 49. The 13-bit phase information is extracted in parallel from the 160-bit unit communication data stored in the fourth 160 shift register (160SR) 61 by the phase correction means 55. The 147-bit unit device data from which the phase information has been extracted is applied in parallel to the fourth 147 shift register (147SR) 63. Then the 147-bit unit device data stored in the fourth 147 shift register (147SR) 63 is output in series from the fourth 147 shift register (147SR) 63 to the second OR circuit 65 in bit-synchronism with the second clock synchronous signal MCK at the timing of the first block synchronous signal HBLR=H.

The second OR circuit 65 carries out the OR operation of the 147-bit unit device data applied in series from the third 147 shift register (147SR) 59 and the 147-bit unit device data applied in series from the fourth 147 shift register (147SR) 63 and outputs the result of the OR operation of both device data as device data.

The device data output from the second OR circuit 65 is obtained by demodulating communication data bit synchronized with the predetermined transmission reference clock (48 kHz) HCK so that it is bit-synchronized with the second clock synchronous signal (44.1 kHz) MCK, and this demodulated device data is received by the functional device N connected to the output unit I/F 13.

According to the communication method and the communication system of the present invention, to demodulate communication data which has been modulated so that it is bit-synchronized with the predetermined transmission reference clock (48 kHz) HCK into the device data which is bit-synchronized with the second clock synchronous signal (44.1 kHz) MCK for reception, the communication data having 160-bit data per block is demodulated into device data having 147-bit data per block and phase information which has been provided using the 13-bit empty area which is equivalent to the difference between 160 bits and 147 bits is extracted at the time of demodulation, as shown in FIG. 7, thereby making unnecessary the processing of thinning bits and making it possible to demodulate the communication data which has been modulated so that it is bit-synchronized with the predetermined transmission reference clock (48 kHz) HCK into the device data which is bit-synchronized with the second clock synchronous signal (44.1 kHz) MCK for reception. As a result, digital data can be transmitted truly and precisely from an input unit to an output unit having a different sampling rate from that of the input unit.

The present invention is not limited to the above embodiment and can be carried out in other embodiments by adding suitable modifications to the above embodiment.

In this embodiment, the device data bit-synchronized with the second clock synchronous signal (44.1 kHz) MCK is modulated into communication data bit-synchronized with the predetermined transmission reference clock (48 kHz) HCK and the communication data which has been modulated so that it is bit-synchronized with the predetermined transmission reference clock (48 kHz) HCK is demodulated into the device data bit-synchronized with the second clock synchronous signal (44.1 kHz) MCK. The present invention is not limited to this embodiment. For example, device data bit synchronized with the third clock synchronous signal (32 kHz) LCK may be modulated into communication data bit-synchronized with the predetermined transmission reference clock (48 kHz) HCK and the communication data which has been modulated so that it is bit-synchronized with the predetermined transmission reference clock (48 kHz) HCK may be demodulated into device data bit-synchronized with the first clock synchronous signal (32 kHz) LCK.

In this case, utilizing that 32 K:48 K=2:3, device data contained in two sub-channels of the third frame synchronous signal LLR out of the device data bit-synchronized with the third clock synchronous signal (32 kHz) LCK are assigned to two sub-channels out of the three sub-channels of the first frame synchronous signal HLR and phase information is assigned to the one remaining sub-channel out of the three sub-channels of the first frame synchronous signal HLR, thereby modulating the device data into communication data. Conversely, device data occupying two sub-channels out of the modulated communication data are assigned to two sub-channels of the third frame synchronous signal LLR and phase correction is carried out with reference to the phase information extracted from the modulated communication data, thereby demodulating the modulated communication data into device data.

Finally, the number of bits contained in each frame, i.e. each sub-channel, is 32 in this embodiment. The present invention is not limited to this. It is needless to say that the number of bits contained in each sub-channel can be changed to a suitable value such as 16 bits.

What is claimed is:

1. A transmission method, used in a transmission system constructed by interconnecting a plurality of repeaters, each having at least one device connected thereto, by a transmission line, for exchanging digital data between devices, between repeaters, or between a device and a repeater, the method comprising the steps of:

setting a transmission reference clock which is the basis for an exchange of communication data between repeaters to an appropriate value in advance with reference to a plurality of device reference clocks set in at least one device;

setting a number of bits of each unit block of communication data synchronized with the transmission reference clock and a number of bits of each unit block of plural device data synchronized with the plurality of device reference clocks respectively, to appropriate values in advance with reference to frequencies of the plurality of device reference clocks and a frequency of the transmission reference clock;

modulating, by a repeater, device data to communication data synchronized with the transmission reference clock, when the device data synchronized with the device reference clock set in a source device connected to the repeater is output from the source device;

adding a phase information to be used to demodulate the modulated communication data into device data, to an empty area which is equivalent to a difference between a number of bits of each unit block of the device data and a number of bits of each unit block of the communication data synchronized with the transmission reference clock, at the time of the modulation by the repeater; and transmitting the modulated communication data to a predetermined destination by the repeater.

2. The transmission method of claim 1, wherein the phase information comprises a phase difference between a block synchronous signal of communication data synchronized with the transmission reference clock and a synchronous signal of a device reference clock set in the source device.

3. A transmission method, used in a transmission system constructed by interconnecting a plurality of repeaters, each having at least one device connected thereto, by a transmission line, for exchanging digital data between devices, between repeaters, or between a device and a repeater, the method comprising the steps of:

setting a transmission reference clock which is the basis for an exchange of communication data between repeaters to an appropriate value in advance with reference to a plurality of device reference clocks set in at least one device;

setting a number of bits of each unit block of communication data synchronized with the transmission reference clock and a number of bits of each unit block of plural device data synchronized with the plurality of device reference clocks respectively, to appropriate values in advance with reference to frequencies of the plurality of device reference clocks and a frequency of the transmission reference clock;

demodulating, by a repeater, received communication data to device data synchronized with the device reference clock set in a destination device connected to the repeater, when the repeater receives communication data modulated to synchronize with the transmission reference clock and addressed to the destination device;

extracting a phase information added at the time of modulation by using an empty area which is equivalent to a difference between a number of bits of each unit block of the device data and a number of bits of each unit block of the communication data synchronized with the transmission reference clock, at the time of demodulation by the repeater; and transmitting, by the repeater, the demodulated communication data to the destination device.

4. The transmission method of claim 3, wherein the phase information comprises a phase difference between a block synchronous signal of communication data synchronized with the transmission reference clock and a synchronous signal of a device reference clock set in a source device.

5. A transmission method, used in a transmission system constructed by interconnecting a plurality of repeaters, each having at least one device connected thereto, by a transmission line, for exchanging digital data between devices, between repeaters, or between a device and a repeater, the method comprising the steps of:

setting a transmission reference clock which is the basis for an exchange of communication data between repeaters to an appropriate value in advance with reference to a plurality of device reference clocks set in at least one device;

setting a number of bits of each unit block of communication data synchronized with the transmission reference clock and a number of bits of, each unit block of plural device data synchronized with the plurality of device reference clocks respectively, to appropriate values in advance with reference to frequencies of the plurality of device reference clocks and a frequency of the transmission reference clock;

modulating, by a repeater, device data to communication data synchronized with the transmission reference clock, when the device data synchronized with the device reference clock set in a source device connected to the repeater is output from the source device;

adding a phase information to be used to demodulate the modulated communication data into device data, to an empty area which is equivalent to a difference between a number of bits of each unit block of the device data and a number of bits of each unit block of the communication data synchronized with the transmission reference clock, at the time of the modulation by the repeater;

transmitting the modulated communication data to a predetermined destination by the repeater;

demodulating, by the repeater, received communication data to device data synchronized with the device reference clock set in a destination device connected to the repeater, when the repeater receives communication data modulated to synchronize with the transmission reference clock and addressed to the destination device;

extracting the phase information added at the time of modulation by using the empty area which is equivalent to the difference between the number of bits of each unit block of the device data and the number of bits of each unit block of the communication data synchronized with the transmission reference clock, at the time of demodulation by the repeater; and transmitting, by the repeater, the demodulated communication data to the destination device.

6. The transmission method of claim 5, wherein the phase information comprises a phase difference between a block synchronous signal of communication data synchronized with the transmission reference clock and a synchronous signal of a device reference clock set in the source device.

7. A transmission system constructed by interconnecting a plurality of repeaters, each having at least one device connected thereto, by a transmission line, for exchanging digital data between devices, between repeaters, or between a device and a repeater, each of the plurality of repeaters comprising:

modulating means for modulating device data to communication data synchronized with the transmission reference clock, when the device data synchronized with the device reference clock set in a source device connected to the repeater is output from the source device, the transmission reference clock being the basis for an exchange of communication data between repeaters and being set to an appropriate value in advance with reference to a plurality of device reference clocks set in at least one device;

phase information adding means for adding a phase information to be used to demodulate the modulated communication data into device data, to an empty area which is equivalent to a difference between a number of bits of each unit block of the device data and a number of bits of each unit block of the communication data synchronized with the transmission reference clock, at the time of the modulation by the modulating means, a number of bits of each unit block of the communication data synchronized with the transmission reference clock and a number of bits of each unit block of plural device data synchronized with the plurality of device reference clocks respectively being set to appropriate values in advance with reference to frequencies of the plurality of device reference clocks and a frequency of the transmission reference clock; and transmitting means for transmitting the communication data modulated by the modulating means to a predetermined destination.

8. The transmission system of claim 7, wherein the phase information comprises a phase difference between a block synchronous signal of communication data synchronized with the transmission reference clock and a synchronous signal of a device reference clock set in the source device.

9. A transmission system constructed by interconnecting a plurality of repeaters, each having at least one device connected thereto, by a transmission line, for exchanging digital data between devices, between repeaters, or between a device and a repeater, each of the plurality of repeaters comprising:

demodulating means for demodulating received communication data to device data synchronized with the device reference clock set in a destination device connected to the repeater, when the repeater receives communication data modulated to synchronize with the transmission reference clock and addressed to the destination device, the transmission reference clock being the basis for an exchange of communication data between repeaters and being set to an appropriate value in advance with reference to a plurality of device reference clocks set in at least one device;

phase information extracting means for extracting a phase information added at the time of modulation by using an empty area which is equivalent to a difference between a number of bits of each unit block of the device data and a number of bits of each unit block of the communication data synchronized with the transmission reference clock, at the time of demodulation by the demodulating means, a number of bits of each unit block of the communication data synchronized with the transmission reference clock and a number of bits of each unit block of plural device data synchronized with the plurality of device reference clocks respectively being set to appropriate values in advance with reference to frequencies of the plurality of device reference clocks and a frequency of the transmission reference clock; and transmitting means for transmitting the communication data demodulated by demodulating means to the destination device.

10. The transmission system of claim 9, wherein the phase information comprises a phase difference between a block synchronous signal of communication data synchronized with the transmission reference clock and a synchronous signal of a device reference clock set in a source device.

11. A transmission system constructed by interconnecting a plurality of repeaters, each having at least one device connected thereto, by a transmission line, for exchanging digital data between devices, between repeaters, or between a device and a repeater, each of the plurality of repeaters comprising:

modulating means for modulating device data to communication data synchronized with the transmission reference clock, when the device data synchronized with the device reference clock set in a source device connected to the repeater is output from the source device, the transmission reference clock being the basis for an exchange of communication data between repeaters and being set to an appropriate value in advance with reference to a plurality of device reference clocks set in at least one device;

phase information adding means for adding a phase information to be used to demodulate the modulated communication data into device data, to an empty area which is equivalent to a difference between a number of bits of each unit block of the device data and a number of bits of each unit block of the communication data synchronized with the transmission reference clock, at the time of the modulation by the modulating means, a number of bits of each unit block of the communication data synchronized with the transmission reference clock and a number of bits of each unit block of plural device data synchronized with the plurality of device reference clocks respectively being set to appropriate values in advance with reference to frequencies of the plurality of device reference clocks and a frequency of the transmission reference clock;

first transmitting means for transmitting the communication data modulated by the modulating means to a predetermined destination;

demodulating means for demodulating received communication data to device data synchronized with the device reference clock set in a destination device connected to the repeater, when the repeater receives communication data modulated to synchronize with the transmission reference clock and addressed to the destination device;

phase information extracting means for extracting the phase information added at the time of modulation by using the empty area which is equivalent to the difference between the number of bits of each unit block of the device data and the number of bits of each unit block of the communication data synchronized with the transmission reference clock, at the time of demodulation by the demodulating means; and second transmitting means for transmitting the communication data demodulated by demodulating means to the destination device.

12. The transmission system of claim 11, wherein the phase information comprises a phase difference between a block synchronous signal of communication data synchronized with the transmission reference clock and a synchronous signal of a device reference clock set in the source device.

* * * * *

UNITED STATES PATENT AND TRADEMARK OFFICE
CERTIFICATE OF CORRECTION

PATENT NO.     : 6,408,011 B1
DATED          : June 18, 2002
INVENTOR(S)    : Yoshinori Nakatsugawa It is certified that error appears in the above-identified patent and that said Letters Patent is hereby corrected as shown below:

<u>Title page,</u>
Item [75], change "Susono" to -- Shizuoka-ken --.

<u>Column 3,</u>
Line 56, change "sinning" to -- thinning --.

<u>Column 4,</u>
Line 63, connect the paragraph ending on line 63 with the paragraph beginning on line 64.

<u>Column 5,</u>
Line 14, change "singing" to -- thinning --.

<u>Column 6,</u>
Line 53, delete the period.

<u>Column 7,</u>
Line 6, change "sinning" to -- thinning --.

<u>Column 8,</u>
Line 35, change "sinning" to -- thinning --.

Signed and Sealed this

Twenty-eighth Day of January, 2003

JAMES E. ROGAN
*Director of the United States Patent and Trademark Office*